United States Patent
Mendible et al.

(10) Patent No.: US 10,713,858 B2
(45) Date of Patent: Jul. 14, 2020

(54) AIR FLOW HOUR METER

(71) Applicant: Ingersoll-Rand Industrial U.S., Inc., Davidson, NC (US)

(72) Inventors: Ariana Rene Mendible, San Jose, CA (US); Samuel Adam Heard, Woodinville, WA (US); Thanh Duc Tran, Seattle, WA (US); Andrew David Hardesty, Redmond, WA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 22 days.

(21) Appl. No.: 15/675,246

(22) Filed: Aug. 11, 2017

(65) Prior Publication Data
US 2019/0051059 A1 Feb. 14, 2019

(51) Int. Cl.
*G07C 3/04* (2006.01)
*G01F 1/44* (2006.01)
*G01F 15/00* (2006.01)

(52) U.S. Cl.
CPC .............. *G07C 3/04* (2013.01); *G01F 1/44* (2013.01); *G01F 15/002* (2013.01)

(58) Field of Classification Search
CPC ................................. G07C 3/04; G01F 1/363
See application file for complete search history.

(56) References Cited

U.S. PATENT DOCUMENTS

| | | | |
|---|---|---|---|
| 1,785,724 A | 12/1930 | Brant | |
| 3,256,685 A * | 6/1966 | Siewert | G07C 3/04 368/9 |
| 6,607,041 B2 | 8/2003 | Suzuki et al. | |
| 7,089,080 B1 | 8/2006 | Lysaght | |
| 8,091,649 B2 | 1/2012 | Kosuge et al. | |
| 9,537,335 B2 | 1/2017 | Furui et al. | |
| 2006/0074513 A1 | 4/2006 | DeRose et al. | |
| 2007/0209435 A1* | 9/2007 | Sauerlaender | G07C 1/10 73/432.1 |
| 2014/0078868 A1 | 3/2014 | McCaskill, III | |
| 2015/0209927 A1 | 7/2015 | DeLand et al. | |
| 2016/0268873 A1 | 9/2016 | Ideda et al. | |
| 2016/0342151 A1 | 11/2016 | Dey, IV et al. | |

FOREIGN PATENT DOCUMENTS

| | | |
|---|---|---|
| FR | 2902559 A3 | 12/2007 |
| JP | 03228525 A | 10/1991 |
| WO | 2006003455 A1 | 1/2006 |

OTHER PUBLICATIONS https://www.havcontrol.co.uk/buy-products-online/tool-timers/pneumatic-tool-timer-volume-80c fm.html, Jun. 30, 2017.
https://www.castleshop.co.uk/ga2004-p1-pneumatic-tool-timer.html, Jun. 30, 2017.

* cited by examiner

*Primary Examiner* — Justin N Olamit
(74) *Attorney, Agent, or Firm* — Taft Stettinius & Hollister LLP

(57) ABSTRACT

An air flow hour meter is provided. The air flow hour meter includes a passage configured to receive a pressurized fluid flow therethrough. An obstruction in the passage can be positioned in the fluid flow. A sensor in communication with the fluid flow can be configured to measure a pressure differential of the fluid flow between a first point and a second point of the passage. A microprocessor can be configured to calculate the signal-to-noise ratio of the sensor, and a timer can be configured to activate when the signal-to-noise ratio falls below a predetermined limit and otherwise deactivate.

20 Claims, 8 Drawing Sheets

AIR FLOW HOUR METER

BACKGROUND

Technical Field

The present disclosure relates to pneumatic tools and, in particular, to a machine or apparatus for measuring the air flow through the tool.

State of the Art

Pneumatic tools include devices such as winches and hoists, used in oil rig and large-scale manufacturing applications, and smaller hand-held tools for consumer use. Although durable, pneumatic tools require routine maintenance, much like any other tool.

The need for maintenance of pneumatic tools may be based on, or result from, a number of factors, including longevity of use. However, it may be difficult to track usage.

Accordingly, there is a need in the industry for an apparatus that can accurately and consistently track the use of these tools.

SUMMARY

The present disclosure relates to pneumatic tools and in particular to a machine or apparatus for measuring the air flow through the tool.

An aspect of the present disclosure includes an air flow meter comprising: a passage configured to receive a pressurized fluid flow therethrough; an obstruction in the passage and positioned in the fluid flow; a sensor in communication with the fluid flow and configured to measure a pressure differential of the fluid flow between a first point and a second point; a microprocessor configured to calculate the signal-to-noise ratio of the sensor; and a timer configured to activate when the signal-to-noise ratio falls below a predetermined limit and otherwise deactivate.

Another aspect of the present disclosure includes wherein upon activation the timer counts time.

Another aspect of the present disclosure includes wherein the timer counts cumulative time.

Another aspect of the present disclosure includes wherein the obstruction is a Venturi nozzle.

Another aspect of the present disclosure includes wherein the obstruction is a tab extending radially inward from an internal surface of the passage.

Another aspect of the present disclosure includes wherein the first point is upstream of the obstruction and the second point is proximate the obstruction.

Another aspect of the present disclosure includes wherein the fluid flow is between 2 and 90 CFM.

Another aspect of the present disclosure includes a power source electrically coupled to the sensor, the microprocessor, and the timer.

Another aspect of the present disclosure includes a housing in which the power source, the sensor, the microprocessor, and the passage are housed.

Another aspect of the present disclosure includes wherein the passage is positioned in line with the pressurized fluid flow between a source of pressurized fluid and a pneumatic tool.

Another aspect of the present disclosure includes an air flow meter comprising: a passage configured to receive a pressurized fluid flow therethrough; a Venturi nozzle positioned in the passage; a sensor in communication with the fluid flow and configured to sense a flow separation therein as a result of the Venturi nozzle; a microprocessor configured to calculate the signal-to-noise ratio of the sensor; and a timer configured to activate in response to the signal-to-noise ratio and otherwise deactivate.

Another aspect of the present disclosure includes a method of tracking the time that a pneumatic tool is in operation, the method comprising: coupling an air flow hour meter in line between a source of pressurized air and a pneumatically operated tool, the air flow hour meter having a sensor therein; causing the pressurized air to flow through the air flow hour meter; causing flow separation in the pressurized air in the air flow hour meter; sensing the pressure differential in the flow separation using the sensor; calculating a measured signal-to-noise ratio of the sensor; comparing the measured signal-to-noise ratio with a threshold value; activating a timer in response to the measured signal-to-noise ratio falling below the threshold value and otherwise deactivating the timer.

Another aspect of the present disclosure includes calibrating a baseline signal-to-noise ratio of the sensor prior to the causing the pressurized air to flow through the air flow hour meter.

Another aspect of the present disclosure includes calculating the threshold value from a percentage of the baseline signal-to-noise ratio.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

Figure 1:
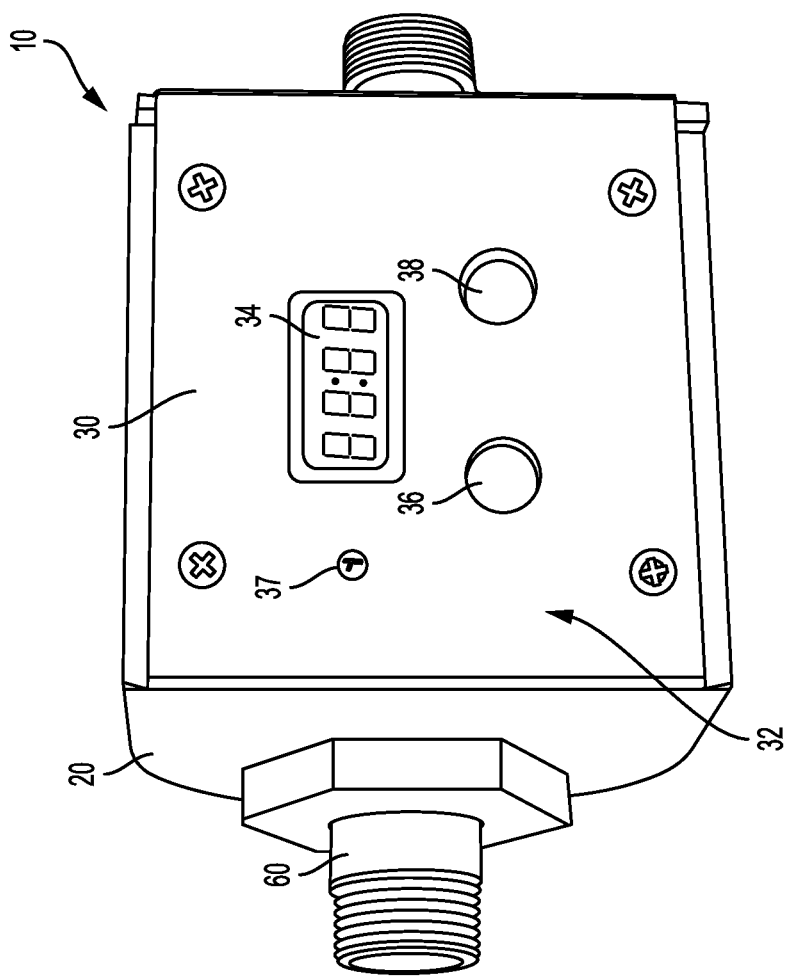
FIG. 1 is a side perspective view of an embodiment of an air flow meter in accordance with the present disclosure.

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The drawings depict one or more illustrative embodiments of an air flow meter apparatus 10. These embodiments may comprise various structural and functional components that complement one another to provide the unique functionality and performance of the apparatus 10, the particular structure and function of which will be described in greater detail herein. For example, the apparatus 10 may comprise a housing 20 having therein a passage 60 for high pressure fluid flow, an obstruction 62 positioned within the flow, and a sensor 70 and control unit 40 for sensing, processing and displaying at least a characteristic of the flow, among other various components to be described herein.

Referring to the Figures, embodiments of the apparatus 10 may comprise a housing 20. The housing 20 may be a container or casing having a body 21 that defines not only an outer shell but also an internal void, cavity or space 22. The body 21 may assume a substantially rectangular shape, but may also assume other functional shapes, such as a square, oval, cylinder, etc. The body 21 may be formed of rigid materials, such as metal, plastic, or the like. For example, the body 21 may comprise a plastic material, such as heat resistant ABS, and may be formed by injection molding or other forming methods. The housing 20 can be designed to be durable and robust, so as to withstand various environmental conditions such as corrosion, heat, dirt, humidity, and temperature. For example, the housing 20 may be configured to withstand and endure temperatures in the range from −20° C. to 55° C. Further in example, the housing 20 may be configured to withstand and endure humid and/or corrosive environments typically found on offshore oil rigs. The internal space 22 may be configured to be large enough to house and contain many of the other component parts of the apparatus 10, including for example the control unit 40 and the power source 50, among others. The internal space 22 may be accessible from one or more sides of the body 21 through a gap 23.

Embodiments of the apparatus 10 may further comprise the housing 20 being configured to support a passage or channel 60 running through the housing 20. The housing 20 may be configured with openings 24 on opposing sides thereof, the openings 24 being configured to receive therein the passage 60 and support the passage 60 in the housing 20. The passage 60 may be coupled to the openings 24 or, on the other hand, directly to the housing 20, as needed. The passage 60 may be releasably coupled to the housing 20 or the openings 24. Alternatively, the passage 60 may be fixedly coupled to the housing 20 or the openings 24. The passage 60 may be coupled to the housing 20 in such a way that the openings 24 are hermetically sealed so as to not allow the ingress of environmental, or external, contaminants into the space 22 once the passage 60 is coupled to the housing 20 and/or the openings 24.

Embodiments of the housing 20 may comprise a display panel 30. The display panel 30 may comprise a user interface 32, a display 34, one or more user-inputs 36 and 38, and an indicator 37. The display panel 30 may comprise a body 31 and the user interface 32. The body 31 may extend orthogonally from the user interface 32. The body 31 may be sized and shaped to fit within the gap 23 of the housing 20. When the display panel 30 is coupled to the housing 20, the body 31 may extend downward into the space 22 to provide additional physical protection to the internal components of the apparatus 10. For example, the body 31 may serve to protect, house, or enclose the control unit 40 and/or the power source 50. The user interface 32 may comprise a flat panel whereupon may be configured the display 34, the one or more user inputs 36 and 38, and the indicator 37. Embodiments of the apparatus 10 may comprise the display 34 being a digital display, such as an LED, LCD, OLED, or other known electronic digital display panel. The user inputs 36 and 38 may be utilized to configure and manipulate the operations of the apparatus 10. The indicator 37 may be a light-based indicator, for example, a light source that lights up, blinks, or otherwise notifies the user of particular characteristics of the power source 50 and/or the apparatus 10. Other indicators, not depicted, may be audio indicators that notify the user of particular characteristics of the power source 50 and/or the apparatus 10.

Embodiments of the display panel 30 may further comprise the display panel 30 being functionally coupled to the housing 20. For example, the display panel 30 may be inserted within the space 22 of the housing 20, with the display panel 30 being in communication with the gap 23 that is configured in one of the sides of the housing 20. The display panel 30 may be configured to be coupled to the housing 20 in the gap 23 to thereby hermetically seal the gap 23 so as to not allow the ingress of environmental, or external, contaminants into the space 22 once the display panel 30 is coupled to the housing 20 and/or the gap 23.

Embodiments of the apparatus 10 may comprise one or more inputs 36 and 38 on the display panel 30. The inputs 36 and 38 may be utilized to instruct the apparatus 10 to calibrate itself or to display numerical values representative of the tracked time the apparatus 10 has tracked. The inputs 36 and 38 may be inputs that instruct the microprocessor 44 to perform any of its intended functions as described herein, such as reset, recalibrate, display, save, and/or track values, among other functions.

Figure 2:
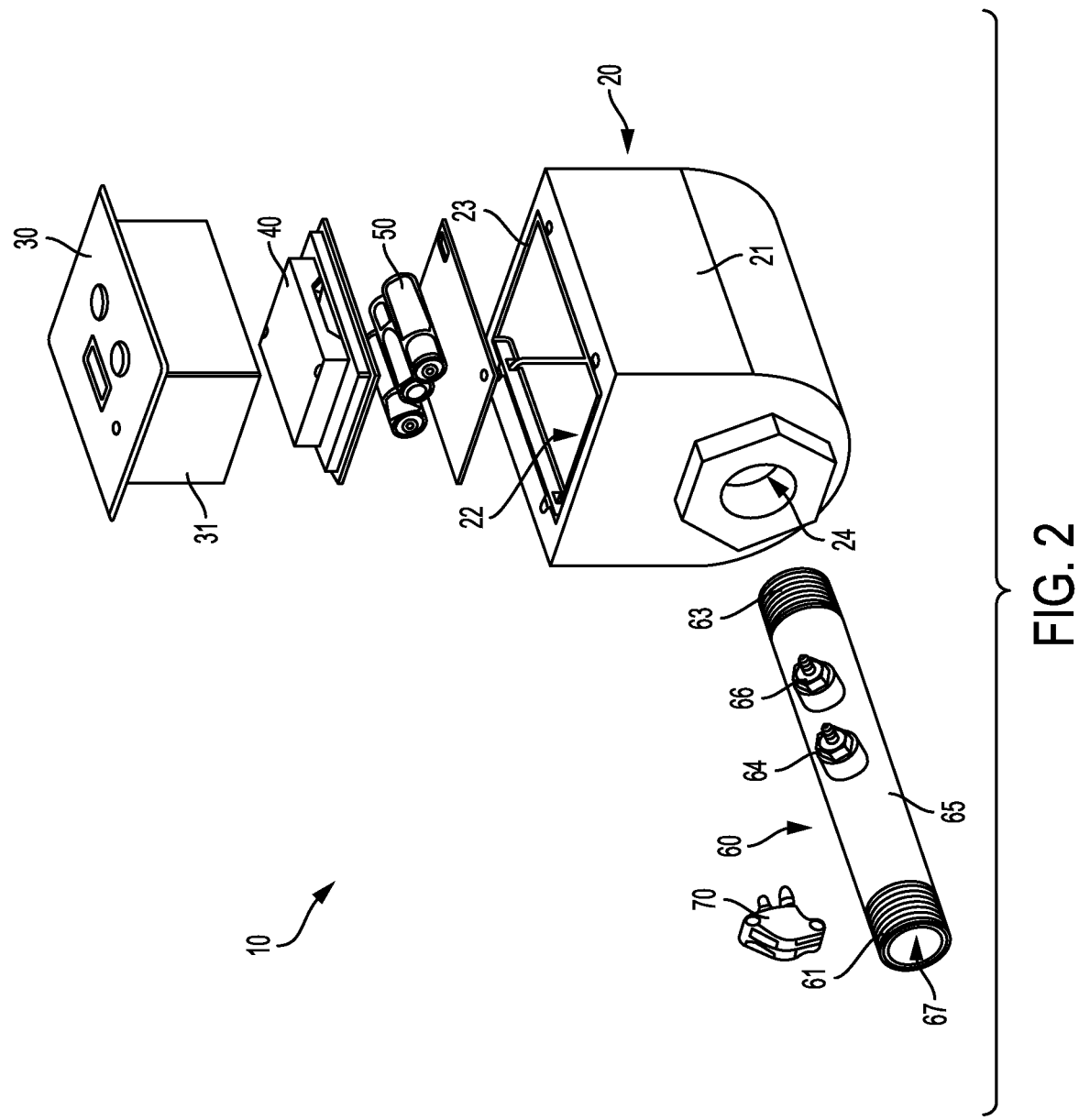
FIG. 2 is an exploded perspective view of portions of an embodiment of an air flow meter in accordance with the present disclosure.
Figure 3:
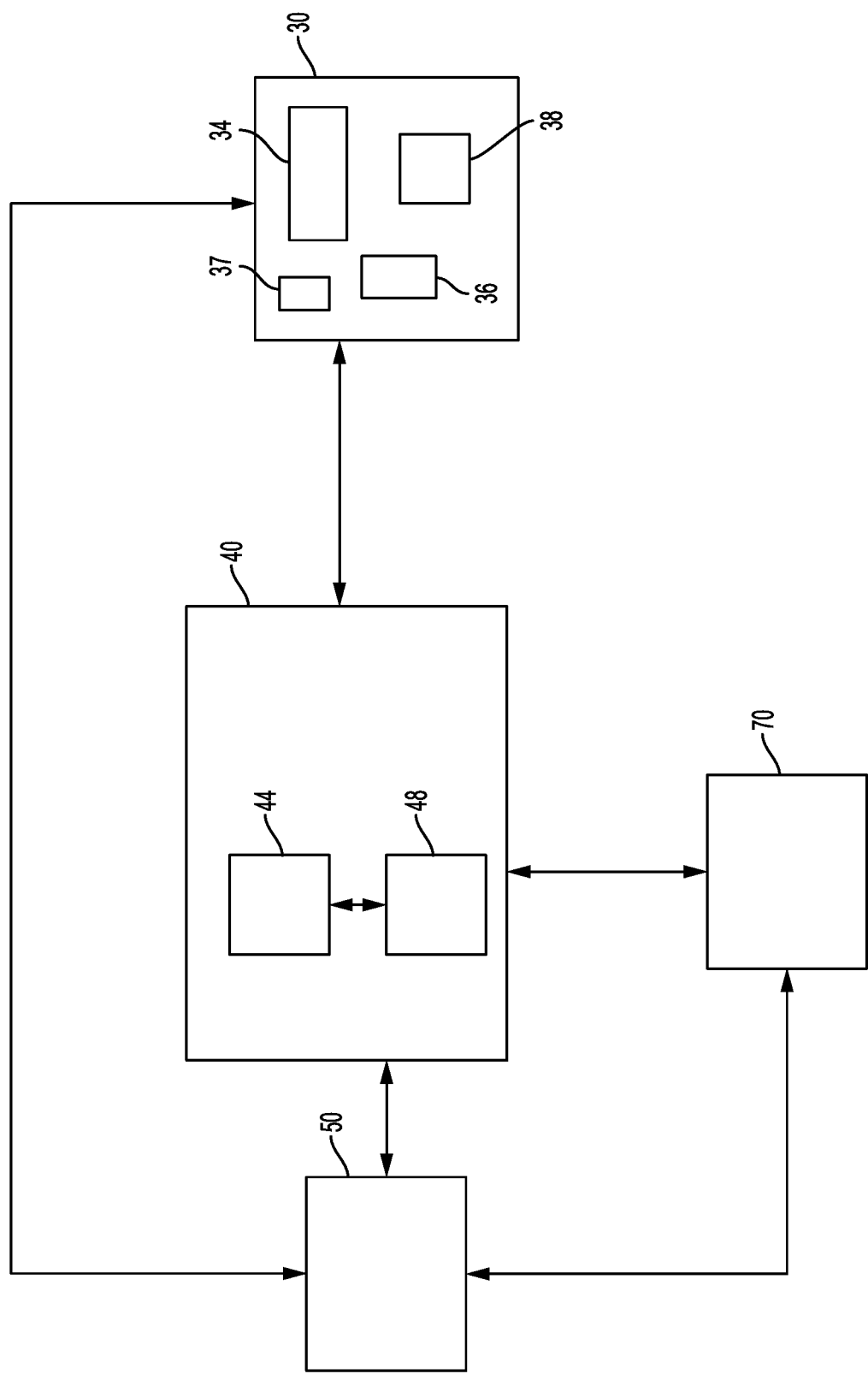
FIG. 3 is a schematic view of portions of an embodiment of an air flow meter in accordance with the present disclosure.

As depicted in FIGS. 2 and 3, embodiments of the apparatus 10 may further comprise a control unit 40. The control unit 40 may be configured to control the operational and functional aspects of the apparatus 10. The control unit 40 may comprise a microprocessor 44 that may provide the computational and logical control processing capabilities that empower the control unit 40 to govern the operational aspects of the apparatus 10. For example, the microprocessor 44 may be configured to detect a signal from the a 70, calculate flow characteristics of the fluid flow F, indicated by arrows in the Figures, based on input from the sensor 70, count tool use time based on the flow characteristics, save the tool use time, and display the time to the user, when requested by the user through the user interface 32. The microprocessor 44 may be configured to communicate with and receive input from the user inputs 36 and 38. The microprocessor 44 may be configured to be programmed with unique source code to implement the operational and functional features of the apparatus 10, while at the same time drawing and requiring relatively minimal power from the power source 50. For example, the microprocessor 44 may be the ATMega328p microprocessor that keeps time with 16 MHz crystal, allowing the microprocessor 44 to run and process data rapidly with 10-bit resolution. The microprocessor 44 may draw low voltages and currents in the ranges of 1.8 to 5.5V and 0.75 μA to 40 mA. The microprocessor 44 may also be configured with sleep capabilities, allowing power consumption to be minimized when active processing is not necessary. The use of the microprocessor 44 may be advantageous over a simple circuit design, because the microprocessor 44 is readily adaptable and allows for calibration to fit various pneumatic devices. The microprocessor 44 may also control the display panel 30. The control unit 40 may also comprise a timer 48 operationally coupled to or associated with the microprocessor 44.

Embodiments of the apparatus 10 may further comprise a power source 50. The power source 50 may be configured to provide electric power to the various components of the apparatus 10, including for example the microprocessor 44. The power source 50 may be either an AC or DC power source. The power source 50 may be a solar power source having solar cells that convert solar energy to electric energy. In the case of a DC power source, the power source 50 may be a battery, such as a bank of batteries or a single battery. The power source 50 may be one or more primary, single-use, batteries, or may be one or more rechargeable batteries. The power source 50 may be one or more alkaline batteries or lithium-ion batteries that are coupled in series. Embodiments of the apparatus 10 may comprise the power source 50 being one or more single cell cylindrical dry batteries. The power source 50 may be electrically coupled to the microprocessor 44 to thereby provide electric power to the microprocessor 44 in the performance of its duties. The power source 50 may further be electrically coupled to the indicator 37, such that the indicator 37 may indicate to the user a low-battery status of the power source 50.

Embodiments of the apparatus 10 may further comprise the power source 50 configured to operate below ignition curves of common hazardous gases, such as hydrogen, ethylene, propane, and methane. For example, the voltages and currents of the power source 50 may be required to fall below these ignition curves, to thereby prevent a spark that would be powerful enough to ignite any of these hazardous gases that may be present in harsh environmental conditions, such as on an offshore oil rig.

Figure 4:
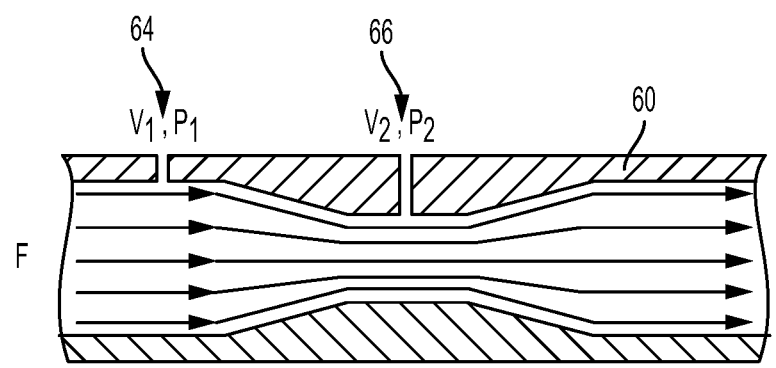
FIG. 4 is a cross-sectional side view of portions of an embodiment of an air flow meter in accordance with the present disclosure.
Figure 5:
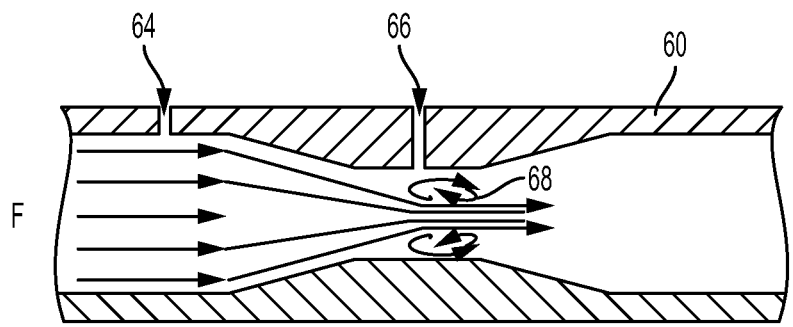
FIG. 5 is a cross-sectional side view of portions of an embodiment of an air flow meter in accordance with the present disclosure.
Figure 6:
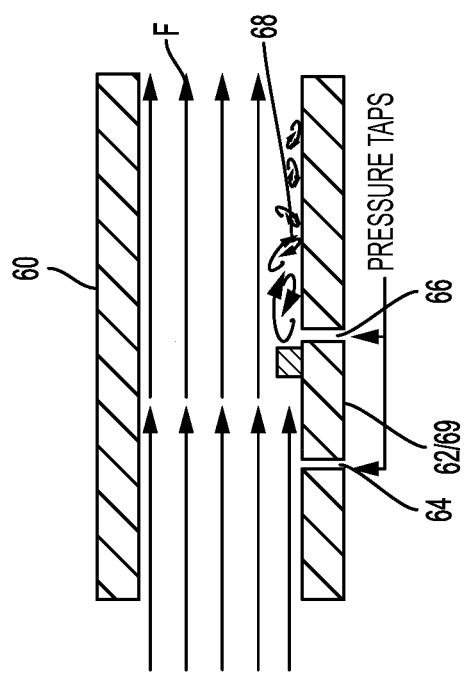
FIG. 6 is a cross-sectional side view of portions of an embodiment of an air flow meter in accordance with the present disclosure.

As depicted in FIGS. 2 and 4-6, embodiments of the apparatus 10 may further comprise a passage 60. The passage 60 may comprise a body 65, the body 65 being a hollow member. For example, the body 65 may be a hollow cylindrical member with a circular cross-section, but may alternatively assume other hollow elongated shapes. The body 65 may be configured to receive therein and therethrough a high-pressure fluid flow, such as compressed air or compressed fluid. The body 65, or passage 60, may therefore comprise a first end 61 and a second end 63, the first and second ends 61 and 63 opposing one another and configured to receive thereon and/or couple thereto a pressurized fluid conduit 80, such as a hose or other quick connect fitting. For example, the first and second ends 61 and 63 may be smooth ends that facilitate a high-pressure fluid conduit 80, such as a pneumatic hose, being clamped around the smooth ends. In this way, an existing pneumatic hose may be cut and the apparatus 10 coupled to the hose at the cut, one end of the hose coupling to the first end 61 and the other end coupling to the second end 63. Alternatively, the first and second ends 61 and 63 may be configured with threads thereon that facilitate the threaded coupling of a high-pressure hose on each of the ends 61 and 63. For example, the first and second ends 61 and 63 may be configured with ¾" NPT threads thereon to receive corresponding threaded attachments, or may be configured to receive thereon an attachment having ¾" NPT threads. Alternatively still, the first and second ends 61 and 63 may be configured with quick connect fittings that facilitate the mating of a corresponding quick connect fitting on a high-pressure hose to the first and second ends 61 and 63. With the high-pressure fluid conduit 80 coupled to the first and second ends 61 and 63, a high-pressure fluid flow F from a high-pressure fluid source may flow through the conduit 80 and into and through the passage 60, entering the first end 61 and exiting through the second end 63. Once through the passage 60, the high-pressure fluid flow F may continue along the conduit 80 to the pneumatic tool/device 100, as depicted in FIG. 6, to power the operations of the tool/device 100.

Figure 8:
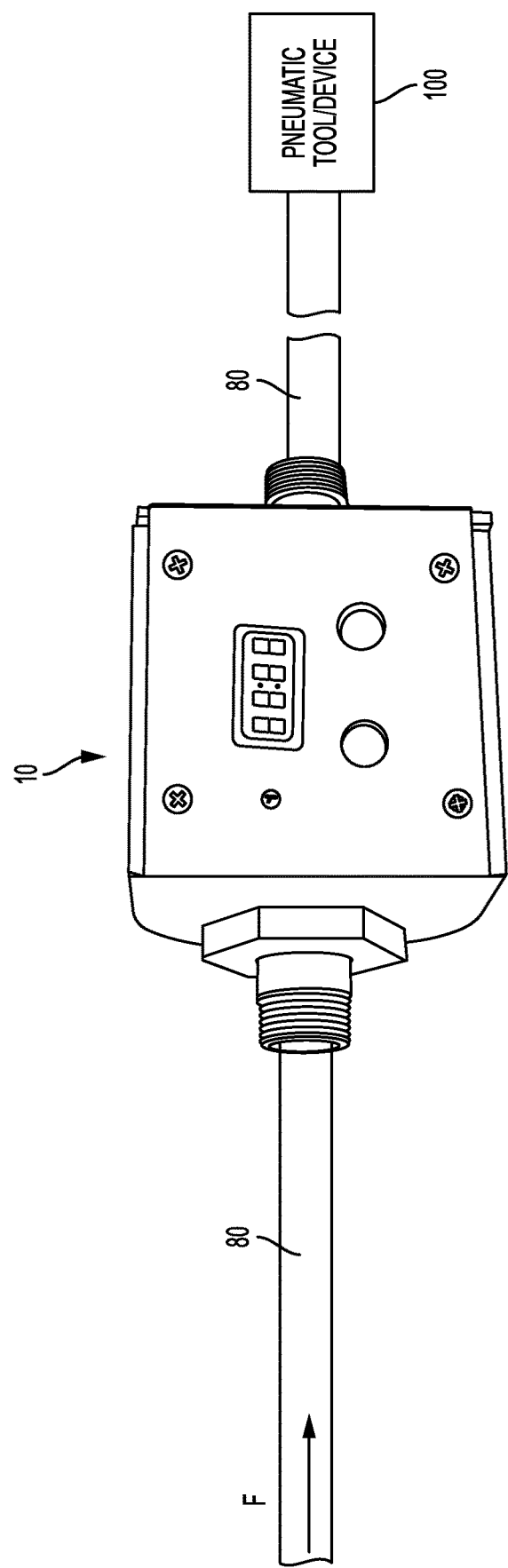
FIG. 8 is a side perspective view of an embodiment of an air flow meter in accordance with the present disclosure.

Embodiments of the apparatus 10 may further comprise the passage 60 being configured to have a cross-sectional geometry that provides for varying pressurized fluid flows. For example, the passage 60 may be configured to sustain and/or handle fluid flows ranging anywhere between 1 CFM and 100 CFM to thereby allow the pressurized flow to reach pneumatic tools 100 requiring between 1 CFM and 100 CFM to operate. Moreover, the passage 60 may be configured to sustain and/or handle pressures up to 150 psi. Under the condition the passage 60 is configured in line with the conduit 80, such as depicted in FIG. 8, the passage 60 may also be configured to reduce or minimize pressure loss of the fluid flow F flowing through the conduit 80 and/or the passage 60. For example, as discussed, the passage 60 may define an internal cavity 67 having relatively smooth interior surfaces to reduce pressure loss. Moreover, the internal cavity 67 of the passage 60 may have a diameter that substantially corresponds with the internal diameter of the conduit 80 to reduce pressure loss.

Embodiments of the apparatus 10 may further comprise an obstruction 62 configured in the passage 60. The obstruction 62 may be positioned within the internal cavity 67 and may be positioned at a point along the length of the passage 60. The obstruction 62 may be positioned within the internal cavity 67 such that the obstruction purposefully increases or decreases the pressure and/or velocity of the fluid flow F flowing through the passage 60. For example, embodiments of the apparatus 10 may comprise the obstruction 62 being configured as a type of Venturi nozzle tube, as depicted in FIG. 4. The Venturi nozzle tube may reduce in diameter at a point along the length of the passage 60 to create or function as the obstruction 62. The fluid flow F may enter the Venturi tube at a pressure P1 and a velocity V1, but at the portion of the Venturi tube with the reduced diameter that creates the obstruction 62, the fluid flow F may flow through the reduced diameter with a pressure P2 that is lower than that of P1 and a velocity V2 that is greater than that of V1. This follows from an understanding of fluid dynamics, which dictates that an incompressible fluid's velocity must increase as it passes through a constriction in accord with the principle of mass continuity, while its static pressure must decrease in accord with the principle of conservation of mechanical energy. The increase or decrease in the pressure and/or velocity of the fluid flow F through the passage 60 due to the obstruction 62 may be a measurable characteristic utilized by the apparatus 10, to be described herein. Moreover, the geometry of the Venturi tube may cause turbulence 68 in the flow F through the Venturi tube. The turbulence 68 may be caused by flow separation of the fluid flow F due to the curves, bends, imperfections, sharp angles, corners, or the like created by the geometry of the Venturi tube, as depicted in FIG. 5. The dimensions of the Venturi tube may comprise the restricted throat diameter of the Venturi tube being between 0.5 inches and 0.9 inches, and in particular about 0.7 inches in diameter. Having a diameter of about 0.7 inches at the constriction point may allow and/or permit the flow rates set forth herein between 1 CFM and 100 CFM without the flow rate reaching a supersonic speed, while at the same time providing for a narrow enough section so that a detectable pressure differential is created even at low flow rates.

Embodiments of the apparatus 10 may further comprise the obstruction 62 being one or more tabs 69 positioned on the internal sidewall of the passage 60 and extending at least partially into the fluid flow F, as depicted in FIG. 6. The tab 69 may be large enough influence the fluid flow F and create disturbance or turbulence 68 in the flow F. It follows that the obstruction 62 may function to create a pressure differential, which in conjunction with the Bernoulli equation, can accurately measure flow.

Embodiments of the apparatus 10 may further comprise first and second pressure taps 64 and 66 configured in the passage 60. The pressure taps 64 and 66 may be in fluidic communication with the internal cavity 67 of the passage 60, such that the fluid flow F through the passage 60 may communicate with the pressure taps 64 and 66. The first pressure tap 64 may be positioned in the passage 60 upstream or downstream of the obstruction 62, whereas the second pressure tap 66 may be positioned proximate the obstruction 62. At the very minimum, the first and second pressure taps 64 and 66 may be positioned in the passage 60 to thereby sense varying characteristics of the fluid flow F upstream, near, and/or downstream of the obstruction 62.

Embodiments of the apparatus 10 may further comprise a sensor 70. The sensor 70 may be a differential pressure transducer in operative communication with the passage 60 and the fluid flow F. The sensor 70 may be capable of sensing the varying characteristics of the fluid flow F upstream, near, and/or downstream of the obstruction 62, depending on the placement and position of the first and second pressure taps 64 and 66. For example, the first pressure tap 64 may be coupled to a first barb of the sensor 70, whereas the second pressure tap 66 may be coupled to a second barb of the sensor 70. In this way, the sensor 70 may process and measure the difference in the pressure of the fluid flow F in the passage 60 between the first and second pressure taps 64 and 66 due to the obstruction 62. The first pressure tap 64 may be coupled to the sensor 70 by a flexible tubing, such as urethane tubing or food-grade tubing. Likewise, second pressure tap 66 may be coupled to the sensor 70 by a flexible tubing, such as urethane tubing or food-grade tubing. The flexible tubing may be thick and durable enough to withstand the harsh environmental operating conditions of the apparatus 10. The sensor 70 may be configured to have a burst pressure of 15 psi differential pressure, that is correspondingly suitable for fluid flow ranges approximately between 1 CFM and 100 CFM. As indicated, the sensor 70 may be a differential pressure transducer, such as the Honeywell HSCSAAN001PDAA5, which has a range of ±1 psi, producing a resolution of 0.0019 psi in conjunction with the microprocessor 44, which is an expected pressure differential of the fluid flow F at low flow rates.

Embodiments of the apparatus 10 may further comprise the sensor 70 being configured to detect the presence of the fluid flow F in the passage 60 and thus the conduit 80 and thus to the tool 100. The sensor 70 may be configured to measure, detect, and/or track the time the fluid flow F is present in the passage 60 and thus the time the tool 100 is operating under pneumatic pressure. The sensor 70 may be configured to measure the pressure differential of the fluid flow F. If there is pressure differential measured by the sensor 70, then there must be fluid flow through the passage 60. However, the Venturi-tube type obstruction 62 may not always produce a measurable pressure differential. In fact, the Venturi-tube type obstruction 62 may produce very noisy data, wherein the sensor 70 measures fluctuating positive and negative differential pressure data, making it difficult to record a consistent value.

However, embodiments of the apparatus 10 may be configured to measure the signal-to-noise ratio (SNR) of the sensor 70 caused by the pressure differential created in the fluid flow F by the obstruction 62 to thereby detect the presence of the fluid flow F. For example, the sensor 70 coupled to the fluid flow F as described herein may receive differential pressure data from the fluid flow F, through the first and second pressure taps 64 and 66, that fluctuates between a positive and a negative differential pressure. The fluctuation in the signal may be derived or produced by the flow separation or the turbulence 68 in the fluid flow F caused by the obstruction 62. Yet, as stated, such turbulence 68 may produce a noisy signal that may be calibrated to correspond to the presence of fluid flow F.

Indeed, the sensor 70 may be calibrated such that the SNR thereof is correlated to flow rate, or in particular the presence of fluid flow F. For example, the apparatus 10, the accompanying logic source code of the microprocessor 44, may provide that the sensor 70 is calibrated to establish a SNR calibrated value when the apparatus 10 is connected to pressure (i.e., coupled in line with the conduit 80), but while there is an absence of fluid flow F. Yet, once fluid flow F is present in the passage 60, the noise of the sensor 70 must necessarily increase as the sensor 70 works to sense the differential pressure in the fluid flow F between the first and second pressure taps 64 and 66. To detect the presence of the fluid flow F, the apparatus 10 may compare the currently measured SNR of the sensor 70 to the SNR calibrated value. Due to the noise in the sensor 70 due to the sensed fluid flow F, the currently measured SNR must necessarily be smaller than when no fluid flow F is present. By comparing the SNR calibrated value with the currently measured SNR during fluid flow, and setting a SNR threshold value below which the fluid flow F must be present due to the amount of noise in the signal of the sensor 70, it may be possible to detect the presence of the fluid flow F by the SNR value of the sensor 70.

Figure 7:
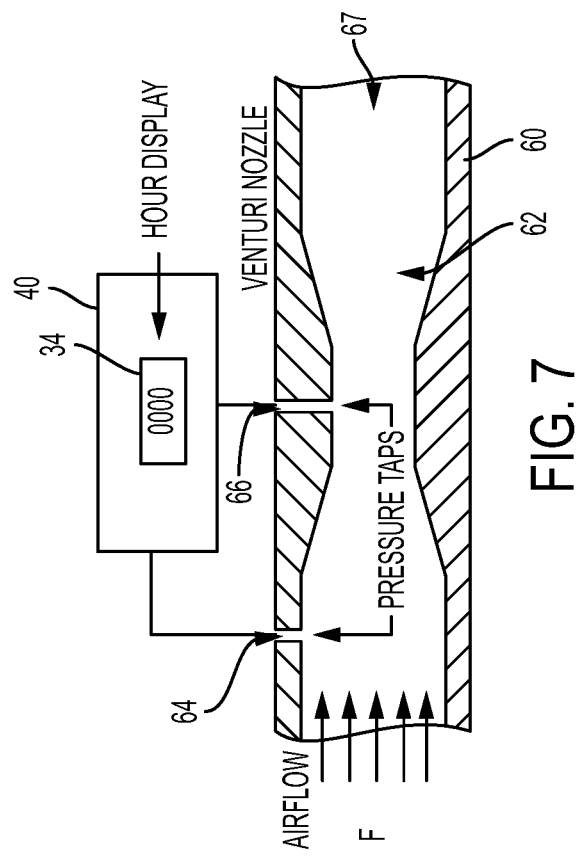
FIG. 7 is a cross-sectional side view of portions of an embodiment of an air flow meter in accordance with the present disclosure.
Figure 9:
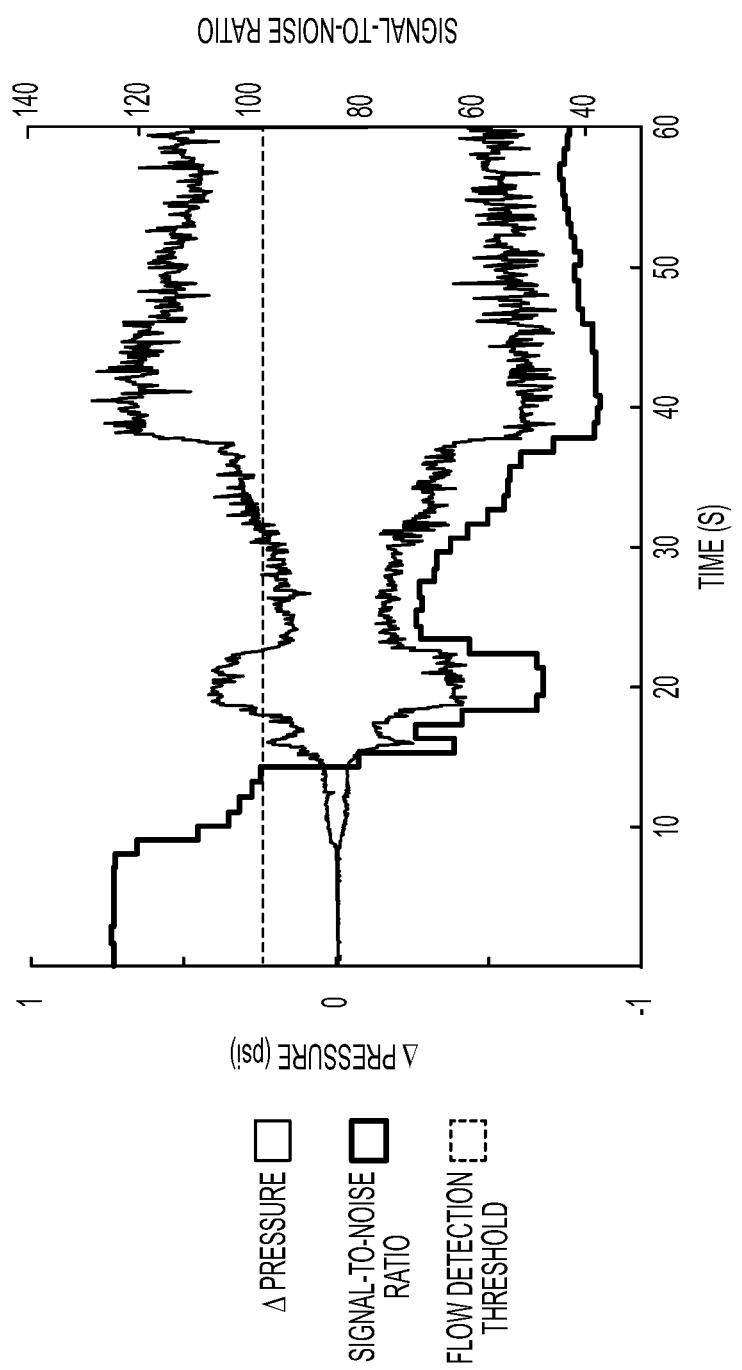
FIG. 9 is a graph depicting the performance characteristics of an embodiment of an air flow meter in accordance with the present disclosure.

As depicted in FIG. 9, at the beginning of the experiment to detect the presence of the fluid flow F in the passage 60 by the value of the SNR of the sensor 70, the sensor 70 is activated to sense the pressure differential in the passage 60. No pressure differential is present between 0 and 10 seconds because the fluid flow F has not been turned on. At the 10 second mark, the fluid flow F is introduced into the passage 60 (the fluid flow F is thereafter increased in flow velocity every subsequent 10 seconds). At the 10 second mark, the sensor 70 begins to measure the fluctuating pressure differential (i.e., change in pressure), between −1.0 and 1.0 psi due to the noisy signal of the turbulence 68 in the fluid flow F due to the obstruction 62. Thereafter, as indicated by FIG. 7, the sensor 70 continues to measure fluctuating pressure differential (i.e., change in pressure), between −1.0 and 1.0 psi, during the time of 10 to 60 seconds. Based on the amount of noise generated in the sensor 70 due to the differential pressure in the fluid flow F caused by the obstruction 62 between the first and second pressure taps 64 and 66 in the passage 60, the currently measured SNR is measured/found. As the flow rate of the fluid flow F is increased over time, the corresponding pressure differential is measured by the signal 70, thus generating greater noise within the sensor 70. As the noise in the sensor 70 increases, the currently measured SNR decreases. When the currently measured SNR decreases below a SNR threshold level, such as for example about 75% of the calibrated SNR, then the apparatus 10 may accurately detect the presence of the fluid flow F. As shown in FIG. 7, the currently measured SNR of the sensor 70 drops significantly at the 10 second mark when the fluid flow F is introduced into the passage 60. At about the 15 second mark, the currently measured SNR value drops below the established SNR threshold value to thereby allow apparatus 10 to confidently declare and track the presence of the fluid flow F.

In operation, as or when the currently measured SNR drops below the SNR threshold value, the microprocessor 44 functions to track the time the currently measured SNR remains below the SNR threshold value. The timer may function to track the single-use time or in the alternative the collective or total time the currently measured SNR remains below the SNR threshold value in consecutive uses. The display panel 30 may be configured to display the total time the apparatus 10 has tracked the fluid flow F flowing through the passage 60, and thus the total time the pneumatic tool 100 has been in operation. Thus, an operator may utilize one of the inputs 36 and 38 to manipulate the display panel 30 to display the time the apparatus 10 has detected the fluid flow F through the passage 60 and thus the total time the tool 100 has been in operation. As such, an operator of the tool 100 may understand and know the "age" of the tool 100 based on usage. Repair and maintenance schedules can be configured based on the data.

Figure 10:
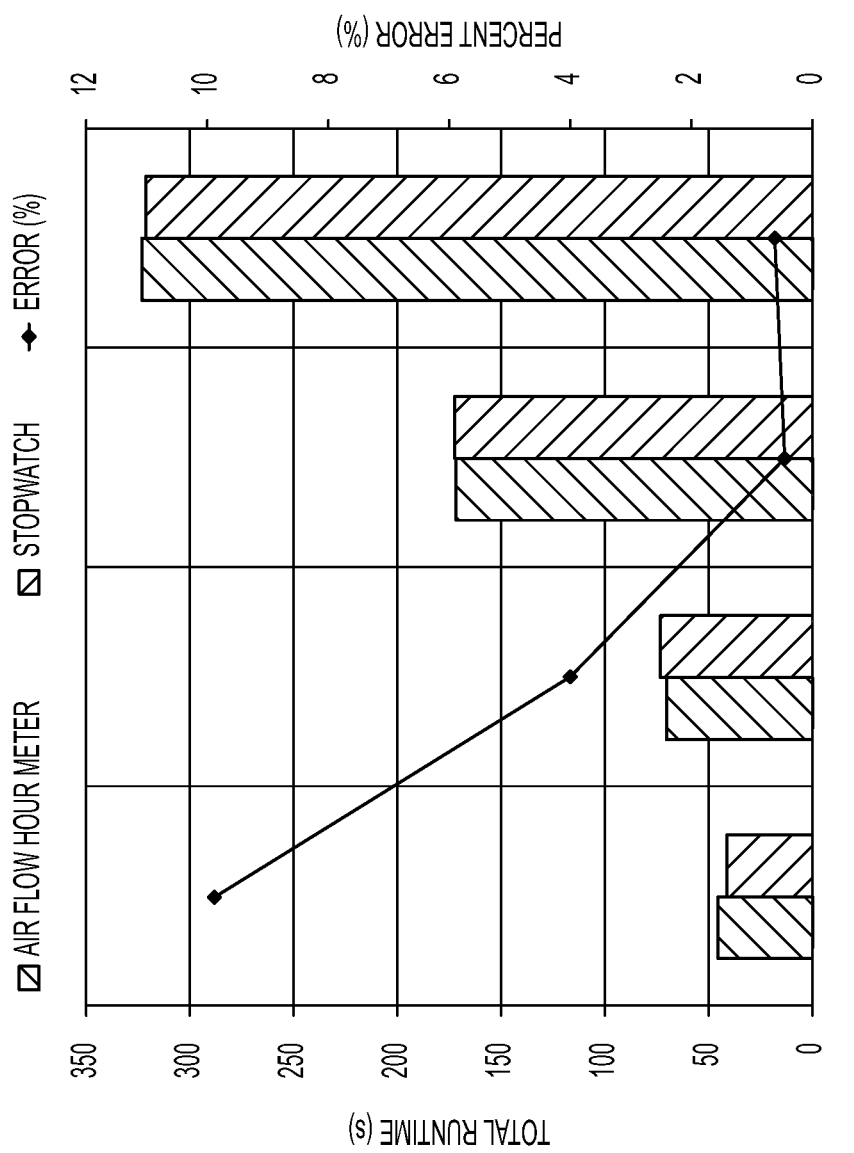
FIG. 10 is a graph depicting the performance characteristics of an embodiment of an air flow meter in accordance with the present disclosure.

As depicted in FIG. 10, the accuracy of the detection of the fluid flow F in the passage 60 is demonstrated. Four separate tests were conducted utilizing the apparatus 10 to track the total time the tool 100 was in operation. In Test 1, the stopwatch calculated the total time of pressurized air flow (i.e., fluid flow F) to the tool to be about 40 seconds, whereas the apparatus 10 positioned in line with the conduit 80 calculated the total time of pressurized air flow (i.e., fluid flow F) to the tool 100 to be about 45 seconds for a relatively large percent error of about 10%. In Test 2, the stopwatch calculated the total time of pressurized air flow (i.e., fluid flow F) to the tool to be about 75 seconds, whereas the apparatus 10 positioned in line with the conduit 80 calculated the total time of pressurized air flow (i.e., fluid flow F) to the tool 100 to be about 70 seconds for a percent error of about 4%. In Test 3, the stopwatch calculated the total time of pressurized air flow (i.e., fluid flow F) to the tool to be about 172 seconds, whereas the apparatus 10 positioned in line with the conduit 80 calculated the total time of pressurized air flow (i.e., fluid flow F) to the tool 100 to be about 170 seconds for a relatively small percent error of less than 1%. In Test 4, the stopwatch calculated the total time of pressurized air flow (i.e., fluid flow F) to the tool to be about 320 seconds, whereas the apparatus 10 positioned in line with the conduit 80 calculated the total time of pressurized air flow (i.e., fluid flow F) to the tool 100 to be about 325 seconds for a relatively small percent error of less than 1%. As the sample size grew larger, the accuracy of the apparatus improved, even bringing the percent error down below 1%.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. An air flow meter comprising:
   a passage configured to receive a pressurized fluid flow therethrough;
   an obstruction in the passage and positioned in the fluid flow;
   a sensor in communication with the fluid flow and configured to measure a pressure differential of the fluid flow between a first point and a second point;
   a microprocessor configured to calculate a signal-to-noise ratio of the sensor; and
   a timer configured to activate when the signal-to-noise ratio falls below a predetermined limit and otherwise deactivate.

2. The air flow meter of claim 1, wherein upon activation the timer counts time.

3. The air flow meter of claim 2, wherein the timer counts cumulative time.

4. The air flow meter of claim 1, wherein the obstruction is a Venturi nozzle.

5. The air flow meter of claim 1, wherein the obstruction is a tab extending radially inward from an internal surface of the passage.

6. The air flow meter of claim 1, wherein the first point is upstream of the obstruction and the second point is proximate the obstruction.

7. The air flow meter of claim 1, wherein the fluid flow is between 2 and 90 CFM.

8. The air flow meter of claim 1, further comprising a power source electrically coupled to the sensor, the microprocessor, and the timer.

9. The air flow meter of claim 8, further comprising a housing in which the power source, the sensor, the microprocessor, and the passage are housed.

10. The air flow meter of claim 1, wherein the passage is positioned in line with the pressurized fluid flow between a source of pressurized fluid and a pneumatic tool.

11. An air flow meter comprising:
    a passage configured to receive a pressurized fluid flow therethrough;
    a Venturi nozzle positioned in the passage;
    a sensor in communication with the fluid flow and configured to sense a flow separation therein as a result of the Venturi nozzle;
    a microprocessor configured to calculate a signal-to-noise ratio of the sensor; and
    a timer configured to activate in response to the signal-to-noise ratio and otherwise deactivate.

12. The air flow hour meter of claim 11, wherein upon activation the timer counts time.

13. The air flow hour meter of claim 12, wherein the time is cumulative.

14. The air flow meter of claim 11, wherein the sensor measures a pressure of the fluid flow at a first point upstream of a Venturi nozzle constriction and at a second point proximate the Venturi nozzle constriction.

15. The air flow meter of claim 11, wherein the fluid flow is between 2 and 90 CFM.

16. The air flow meter of claim 11, further comprising a replaceable power source electrically coupled to the sensor, the microprocessor, and the timer.

17. The air flow meter of claim 1, wherein the passage is positioned in line with the pressurized fluid flow between a source of pressurized fluid and a pneumatic tool.

18. A method of tracking the time that a pneumatic tool is in operation, the method comprising:
  coupling an air flow hour meter in line between a source of pressurized air and a pneumatically operated tool, the air flow hour meter having a sensor therein;
  causing the pressurized air to flow through the air flow hour meter;
  causing flow separation in the pressurized air in the air flow hour meter;
  sensing a pressure differential in the flow separation using the sensor;
  calculating a measured signal-to-noise ratio of the sensor;
  comparing the measured signal-to-noise ratio with a threshold value;
  activating a timer in response to the measured signal-to-noise ratio falling below the threshold value and otherwise deactivating the timer.

19. The method of claim 18, further comprising calibrating a baseline signal-to-noise ratio of the sensor prior to the causing the pressurized air to flow through the air flow hour meter.

20. The method of claim 19, further comprising calculating the threshold value from a percentage of the baseline signal-to-noise ratio.

* * * * *